US012774026B2

(12) United States Patent
Kim et al.

(10) Patent No.: US 12,774,026 B2
(45) Date of Patent: Oct. 27, 2026

(54) VEHICLE STEERING DEVICE

(71) Applicant: HL MANDO CORPORATION, Gyeonggi-do (KR)

(72) Inventors: Jihwan Kim, Gyeonggi-do (KR); Jaehyeong Cho, Seoul (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 379 days.

(21) Appl. No.: 18/387,958

(22) Filed: Nov. 8, 2023

(65) Prior Publication Data

US 2024/0351632 A1 Oct. 24, 2024

(30) Foreign Application Priority Data

Apr. 18, 2023 (KR) ........................ 10-2023-0050816

(51) Int. Cl.
*B62D 5/04* (2006.01)

(52) U.S. Cl.
CPC .................................. *B62D 5/0406* (2013.01)

(58) Field of Classification Search
CPC ............................ B62D 5/0406; B62D 5/0403
See application file for complete search history.

(56) References Cited

U.S. PATENT DOCUMENTS 9,169,833 B2 * 10/2015 McCormick ........... H02K 3/522
9,474,170 B2 * 10/2016 Kim .................... B60R 16/0235
9,505,427 B2 * 11/2016 Fujimoto ............... B62D 5/046
10,050,493 B2 * 8/2018 Kabune .................... H02K 9/00
10,624,248 B2 * 4/2020 Kim ........................ H05K 5/065
10,699,859 B2 * 6/2020 Shimada ................ H01H 15/24
10,710,628 B2 * 7/2020 Asao .................... B62D 5/0403
10,759,469 B2 * 9/2020 Hagiwara .............. H02K 11/33
11,377,137 B2 * 7/2022 Hara .................... B62D 5/0409
2005/0167183 A1 * 8/2005 Tominaga .............. H02K 11/33 180/444
2009/0059498 A1 * 3/2009 Jeong .................... G06F 1/1656 361/748

(Continued)

FOREIGN PATENT DOCUMENTS

JP 2003-318568 11/2003
JP 2007-228673 9/2007

(Continued)

OTHER PUBLICATIONS

Office Action dated Apr. 3, 2025 for Korean Patent Application No. 10-2023-0050816 and its English translation provided by Applicant's foreign counsel.

(Continued)

*Primary Examiner* — Valentin Neacsu
*Assistant Examiner* — Michael R Stabley
(74) *Attorney, Agent, or Firm* — WOMBLE BOND DICKINSON (US) LLP

(57) ABSTRACT

A vehicle steering device comprises a power pack housing having a motor housing in which a motor is embedded and a substrate housing in which a printed circuit board is embedded; a housing cover forming an empty space above the printed circuit board, coupled to an end of the substrate housing, and having a communication hole for communicating with the empty space; and a sealing member injected through the communication hole to fill the empty space and solidified in the empty space of the housing cover.

17 Claims, 13 Drawing Sheets

(56) References Cited

U.S. PATENT DOCUMENTS

| | | | | |
|---|---|---|---|---|
| 2013/0062137 | A1* | 3/2013 | Motoda | H02K 11/33 180/446 |
| 2014/0202781 | A1* | 7/2014 | Soma | H02K 11/33 310/68 D |
| 2015/0171709 | A1* | 6/2015 | Ito | H02K 5/225 310/52 |
| 2016/0064853 | A1* | 3/2016 | Fujimoto | B62D 5/0406 439/587 |
| 2017/0295679 | A1* | 10/2017 | Kim | H05K 5/065 |
| 2018/0127020 | A1* | 5/2018 | Asao | H02K 11/33 |
| 2019/0180958 | A1* | 6/2019 | Shimada | H01H 1/403 |
| 2019/0300047 | A1 | 10/2019 | Hamada | |

FOREIGN PATENT DOCUMENTS

| | | |
|---|---|---|
| JP | 5716956 | 5/2015 |
| JP | 2022-112007 | 8/2022 |
| KR | 10-2017-0136418 | 12/2017 |
| KR | 10-2019-0061074 | 6/2019 |
| KR | 10-2020-0077496 | 6/2020 |
| KR | 10-2022-0165197 | 12/2022 |

OTHER PUBLICATIONS

Notice of Allowance dated Sep. 24, 2025 for Korean Patent Application No. 10-2023-0050816 and its English translation provided by Applicant's foreign counsel.

* cited by examiner

VEHICLE STEERING DEVICE

CROSS-REFERENCE TO RELATED APPLICATION

This application claims priority from Korean Patent Application No. 10-2023-0050816, filed on Apr. 18, 2023, which is hereby incorporated by reference for all purposes as if fully set forth herein.

BACKGROUND

Field

Some embodiments of the present disclosure generally relate to a vehicle steering device and, more specifically, to a rack-driven power assist steering device that may prevent an error or failure in an electronic control unit due to the influx of moisture into the electronic control unit, a malfunction or failure in the electronic control unit during autonomous driving, and a failure in two electronic control units provided for securing reliability due to the influx of moisture, thereby securing the safety of driving.

Description of Related Art

A vehicle steering device may include a motor controlled by an electronic controller, a motor pulley fixed to the motor shaft, a ball nut connecting to the rack bar via balls, a return tube coupled to the ball nut to recirculate the balls, a nut pulley coupled to the outer circumferential surface of the ball nut, and a belt coupled to the motor pulley and the nut pulley.

Steer-by-wire (SBW) steering devices remove mechanical/physical linkages between a steering wheel and front wheels, such as universal joint or intermediate shaft, using a motor to steer the vehicle.

However, in the vehicle steering device, moisture may enter the electronic control unit for various reasons, such as vibration caused while driving the vehicle, impact transferred from the road, and rainwater or water on the road, causing an error or failure in the electronic control unit.

In particular, if the electronic control unit malfunctions or fails during autonomous driving, the motor may not be appropriately controlled, thereby putting the driver at risk.

Therefore, a need arises for research for preventing a malfunction or failure in the electronic control unit due to the influx of external moisture.

BRIEF SUMMARY

Conceived in the foregoing background, certain embodiments of the present disclosure may provide a vehicle steering device that may prevent a malfunction or failure in an electronic control unit due to the influx of moisture into the electronic control unit.

Some of embodiments of the present disclosure may also provide a vehicle steering device that may prevent a malfunction or failure in an electronic control unit during autonomous driving, and a failure in two electronic control units provided for securing reliability due to the influx of moisture, thereby securing the driver's safety.

The objects of embodiments of the disclosure are not limited to the foregoing and other objects will be apparent to one of ordinary skill in the art from the following detailed description.

According to the present embodiments, there may be provided a vehicle steering device comprising a power pack housing having a motor housing in which a motor is embedded and a substrate housing in which a printed circuit board is embedded, a housing cover forming an empty space above the printed circuit board, coupled to an upper end of the substrate housing, and having a communication hole for communicating with the empty space, and a sealing member injected through the communication hole to fill the empty space and solidified.

According to the present embodiments, there may be provided a vehicle steering device comprising a power pack housing including a motor housing in which a motor is embedded and a substrate housing in which a printed circuit board is embedded, wherein the substrate housing includes a bottom portion where the printed circuit board is mounted and a plurality of sidewall portions vertically connecting edges of the bottom portion and a sealing member injected into the substrate housing to fill an upper space and a lower space of the printed circuit board and solidified.

According to the present embodiments, it is possible to prevent an error or failure in an electronic control unit in a vehicle steering device due to the influx of moisture into the electronic control unit.

It is also possible to prevent a malfunction or failure in an electronic control unit during autonomous driving, and a failure in two electronic control units provided for securing reliability due to the influx of moisture, thereby securing the driver's safety.

DESCRIPTION OF DRAWINGS

The above and other objects, features, and advantages of the disclosure will be more clearly understood from the following detailed description, taken in conjunction with the accompanying drawings, in which.

DETAILED DESCRIPTION

Figure 1:
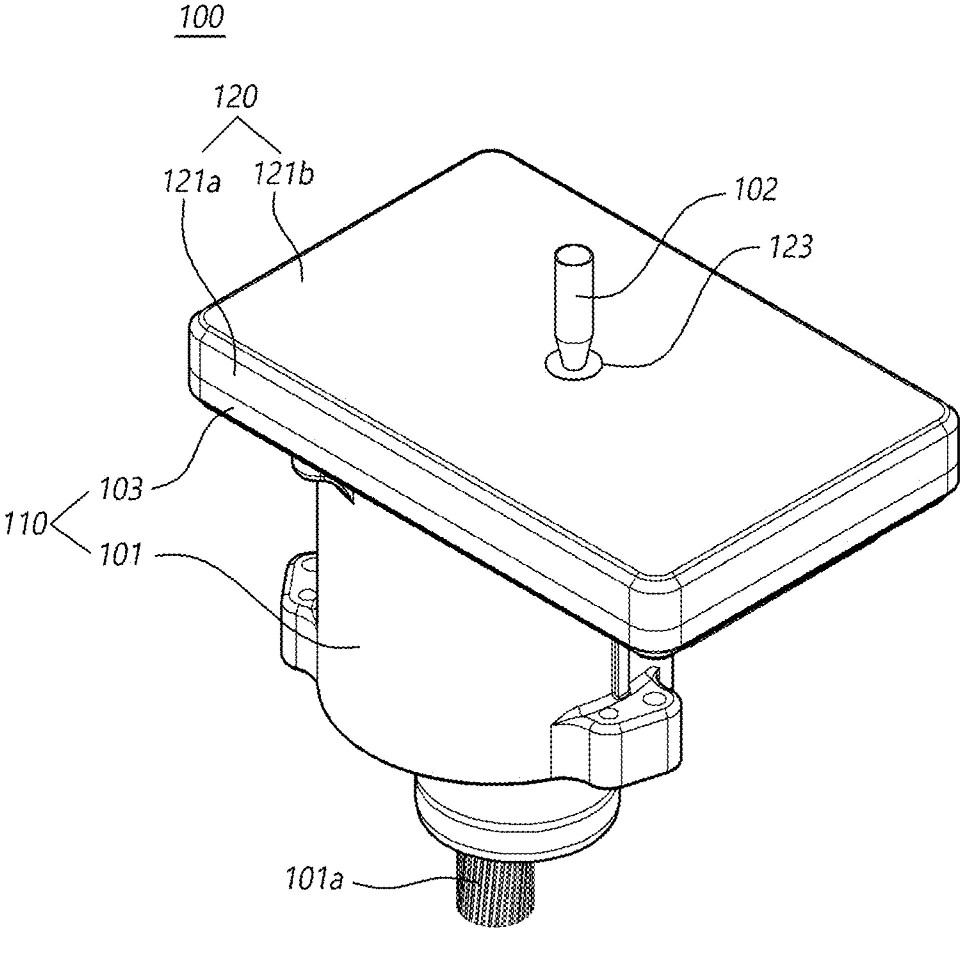
FIGS. 1 to 5 are perspective views illustrating a portion of a vehicle steering device according to an embodiment of the present disclosure.
Figure 2:
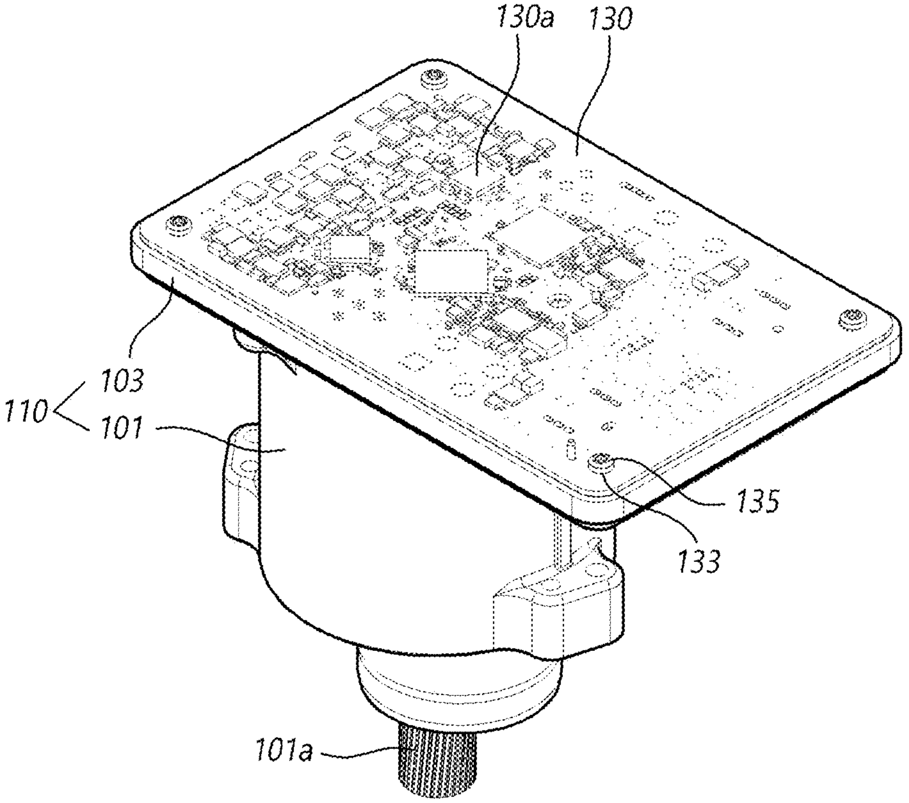
Figure 3:
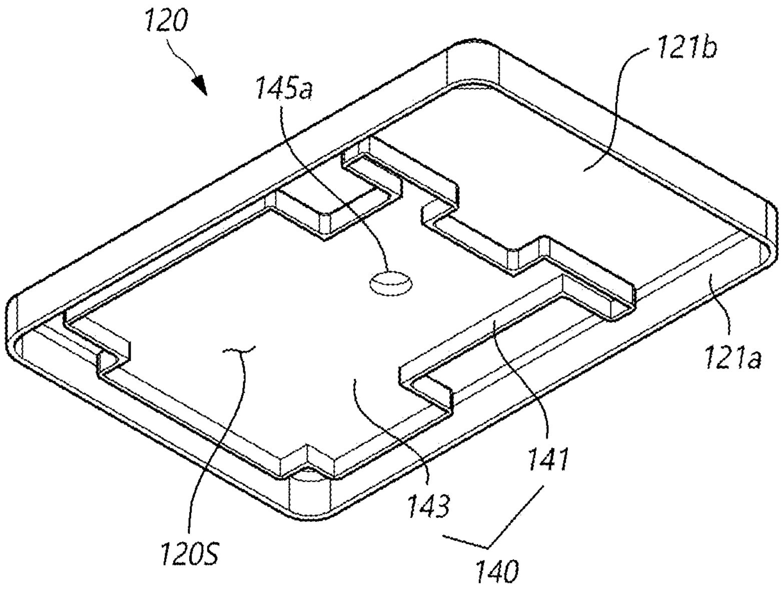
Figure 4:
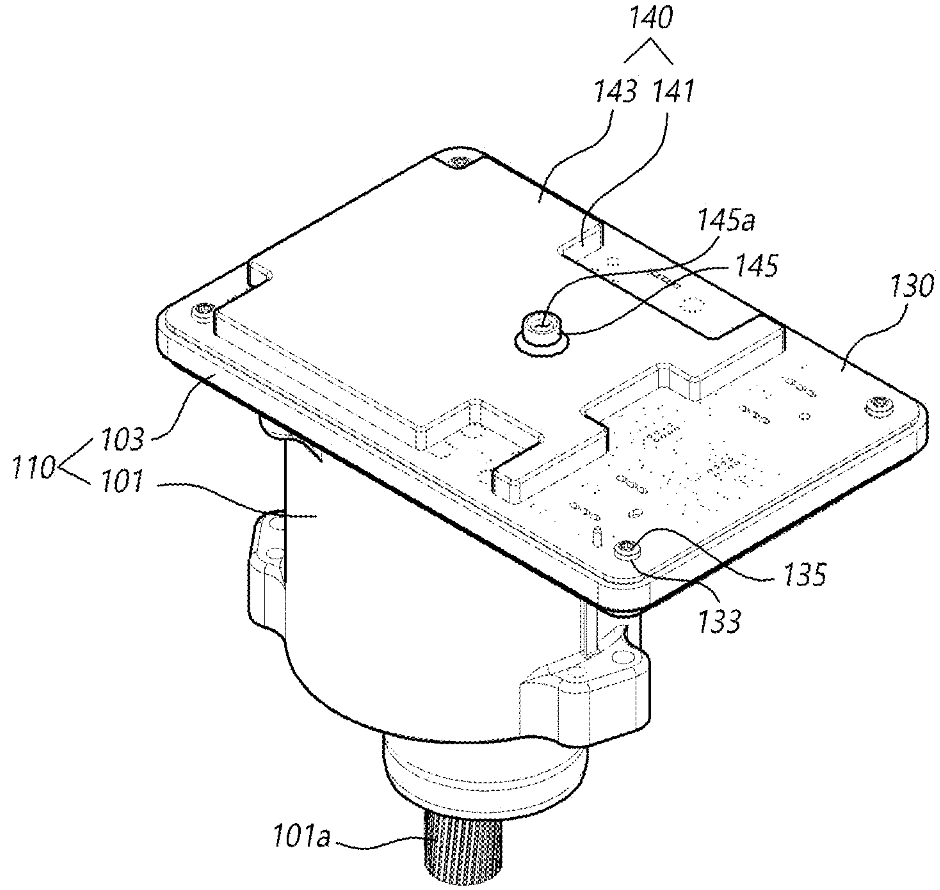
Figure 5:
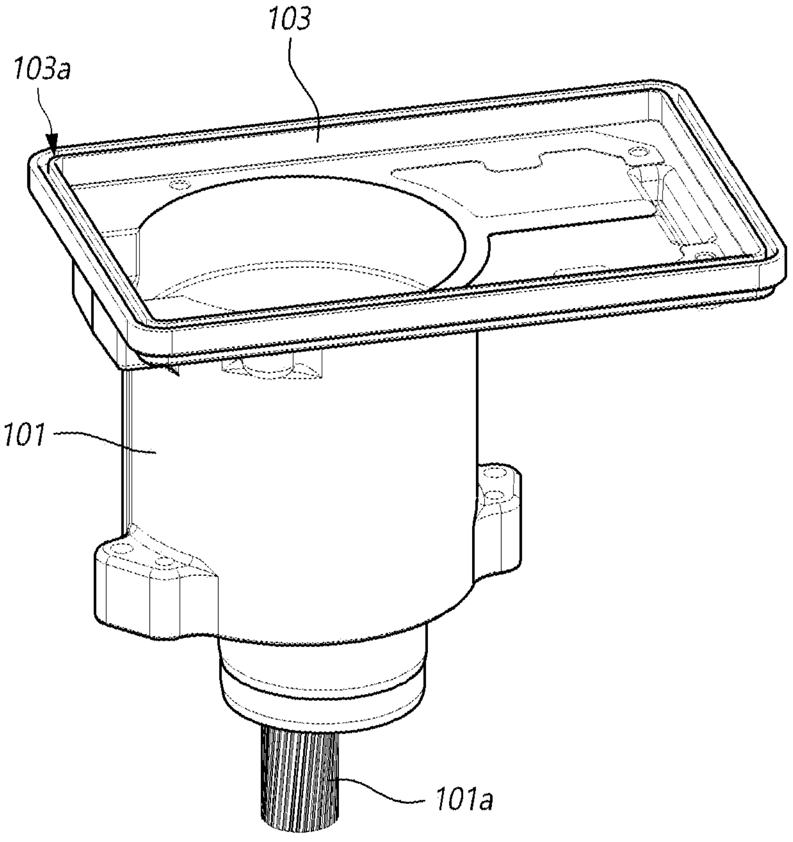

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as “including”, “having”, “containing”, “constituting” “make up of”, and “formed of” used herein are generally intended to allow other components to be added unless the terms are used with the term “only”. As used herein, singular forms are intended to include plural forms unless the context clearly indicates otherwise.

Terms, such as “first”, “second”, “A”, “B”, “(A)”, or “(B)” may be used herein to describe elements of the disclosure. Each of these terms is not used to define essence, order, sequence, or number of elements etc., but is used merely to distinguish the corresponding element from other elements.

When it is mentioned that a first element “is connected or coupled to”, “contacts or overlaps” etc. a second element, it should be interpreted that, not only can the first element “be directly connected or coupled to” or “directly contact or overlap” the second element, but a third element can also be “interposed” between the first and second elements, or the first and second elements can “be connected or coupled to”, “contact or overlap”, etc. each other via a fourth element. Here, the second element may be included in at least one of two or more elements that “are connected or coupled to”, “contact or overlap”, etc. each other.

When time relative terms, such as “after,” “subsequent to,” “next,” “before,” and the like, are used to describe processes or operations of elements or configurations, or flows or steps in operating, processing, manufacturing methods, these terms may be used to describe non-consecutive or non-sequential processes or operations unless the term “directly” or “immediately” is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term “may” fully encompasses all the meanings of the term “can”.

Figure 6:
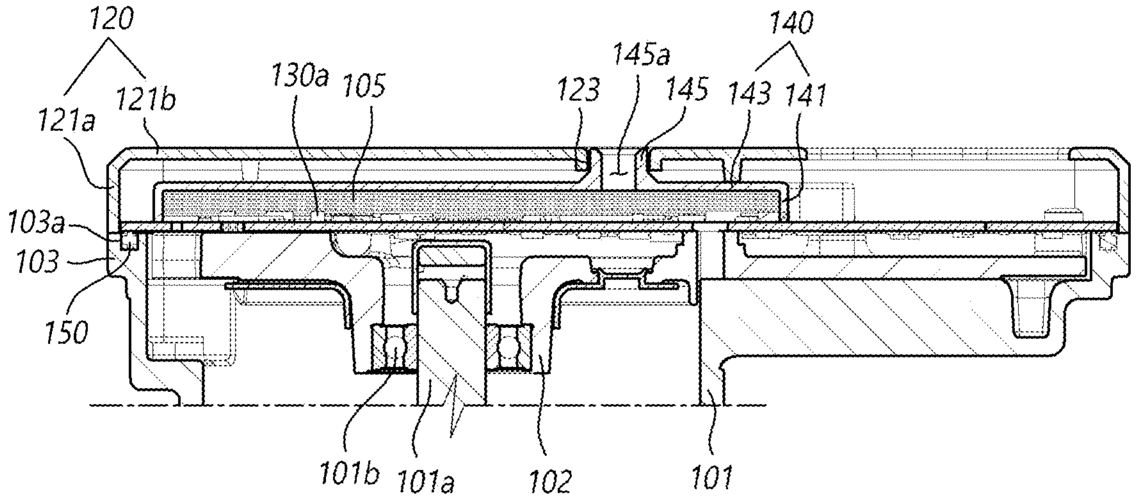
FIGS. 6 and 7 are cross-sectional views illustrating a portion of a vehicle steering device according to an embodiment of the present disclosure.
Figure 7:
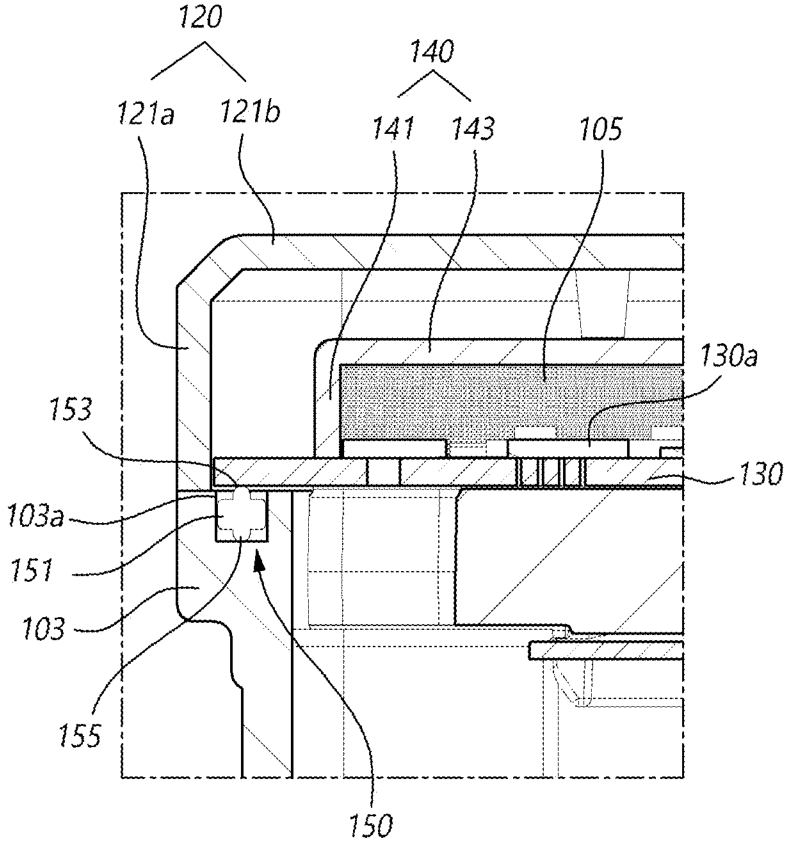
Figure 8:
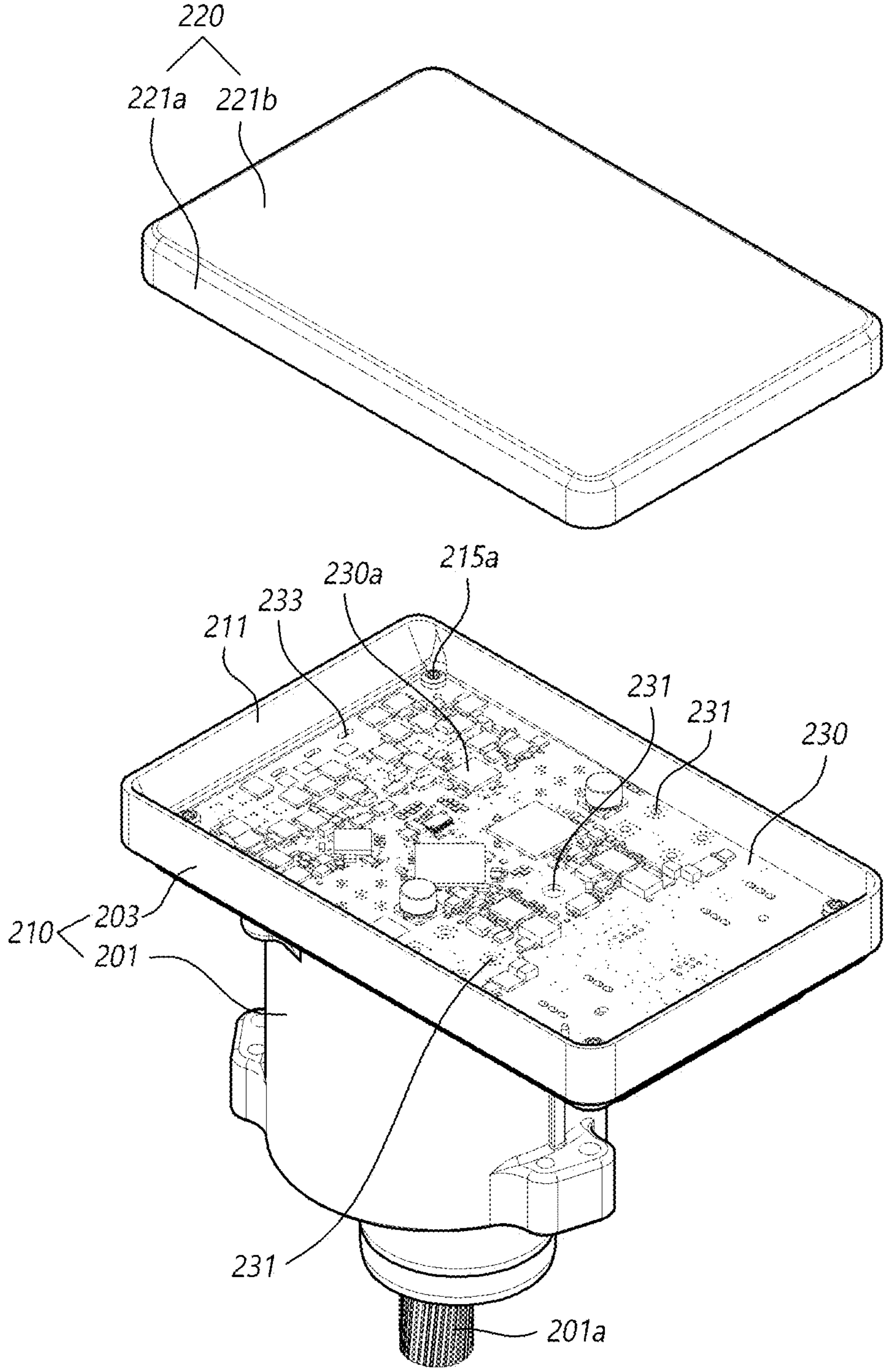
FIG. 8 is an exploded perspective view illustrating a portion of a vehicle steering device according to an embodiment of the present disclosure.
Figure 9:
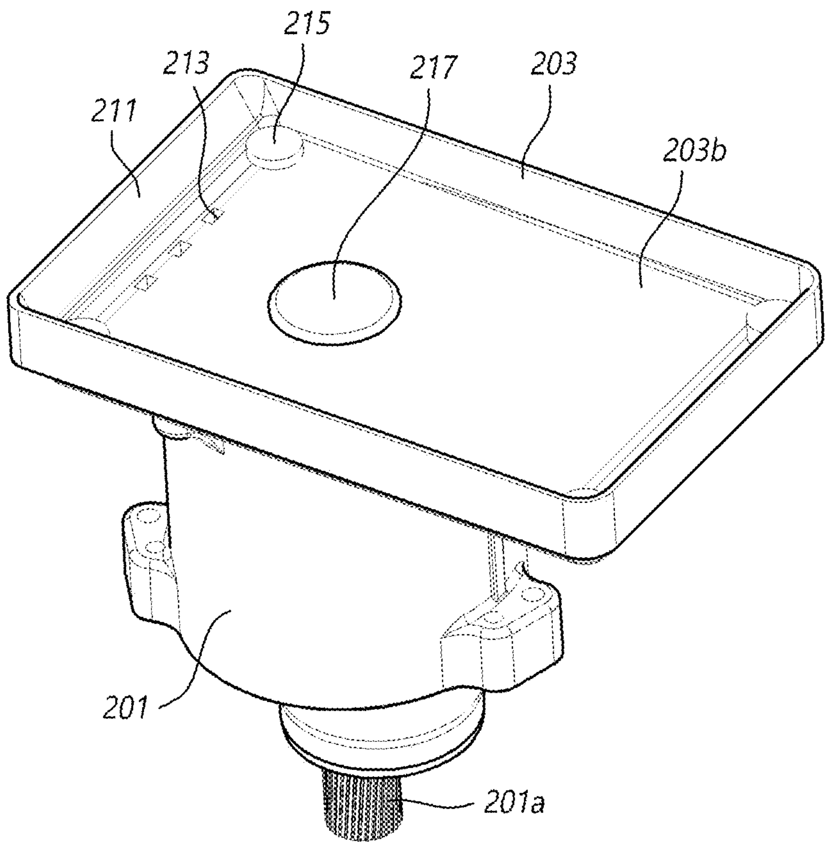
FIG. 9 is a perspective view illustrating a portion of a vehicle steering device according to an embodiment of the present disclosure.
Figure 10:
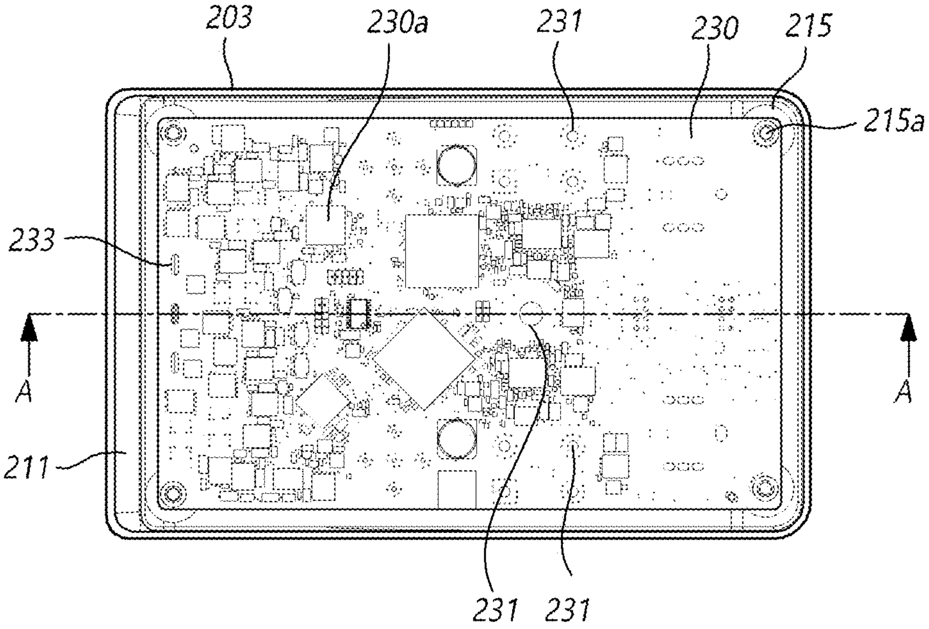
FIG. 10 is a plan view illustrating a portion of a vehicle steering device according to an embodiment of the present disclosure.
Figure 11:
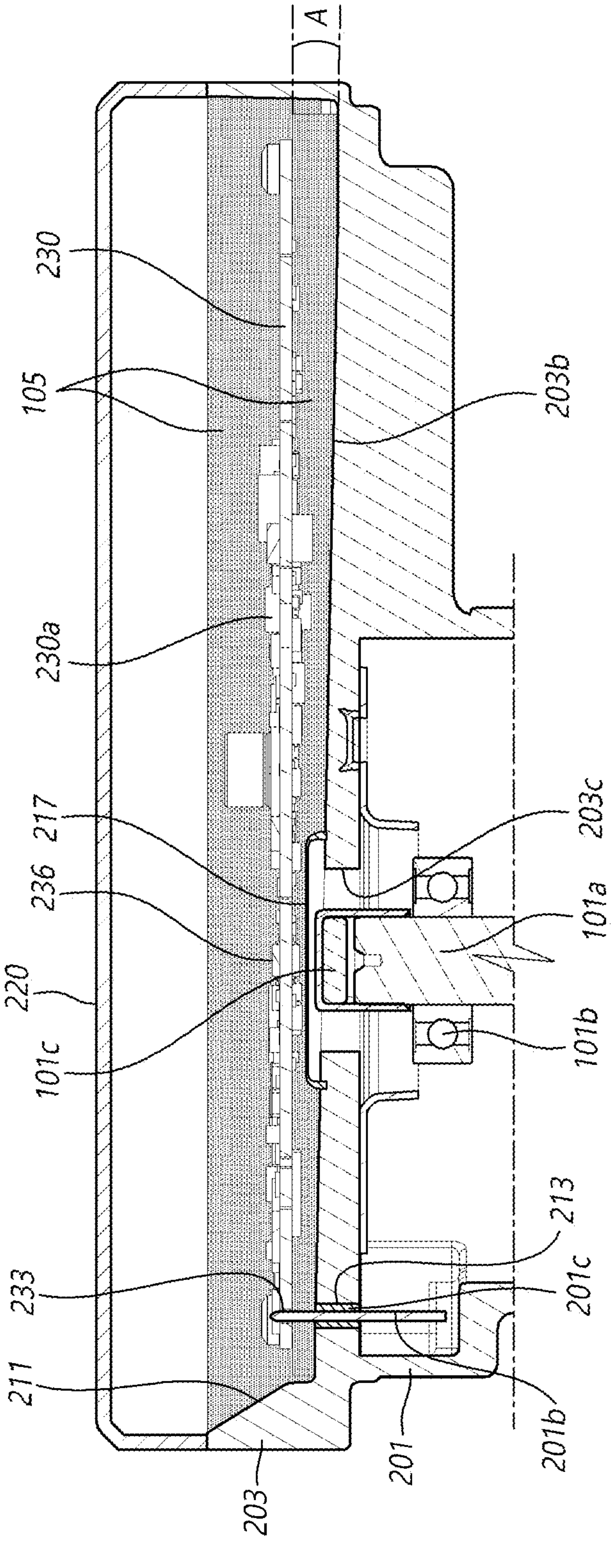
FIG. 11 is a cross-sectional view taken along a line A-A' of FIG. 10.
Figure 12:
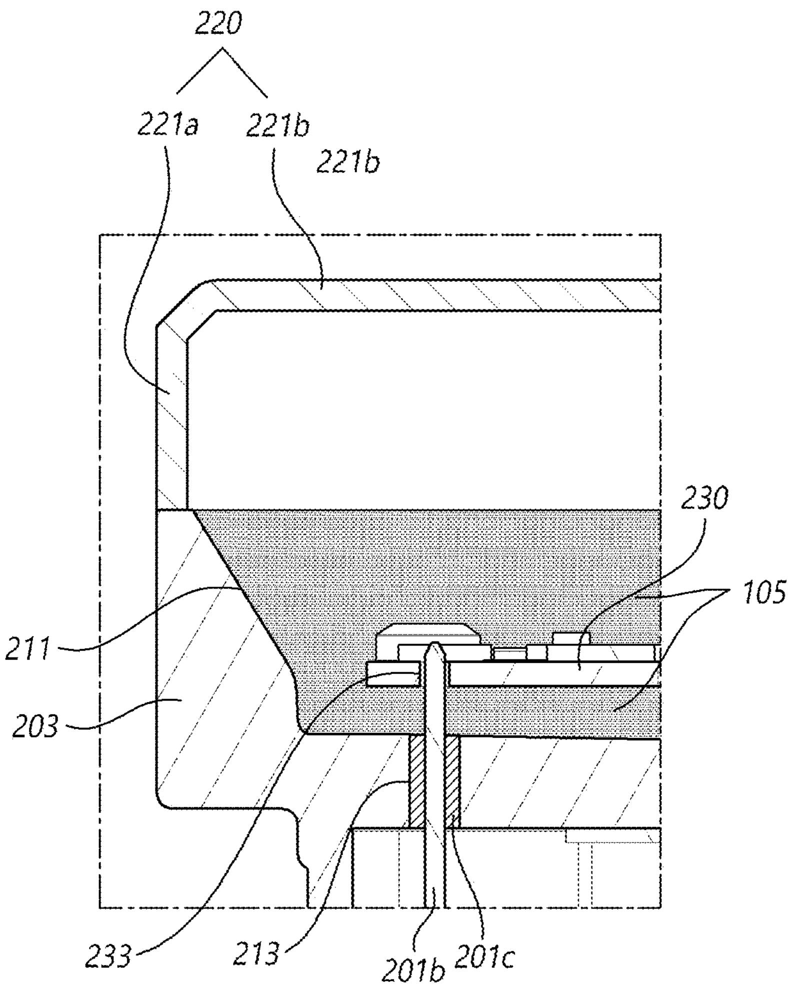
FIGS. 12 and 13 are cross-sectional views illustrating a portion of FIG. 11.
Figure 13:
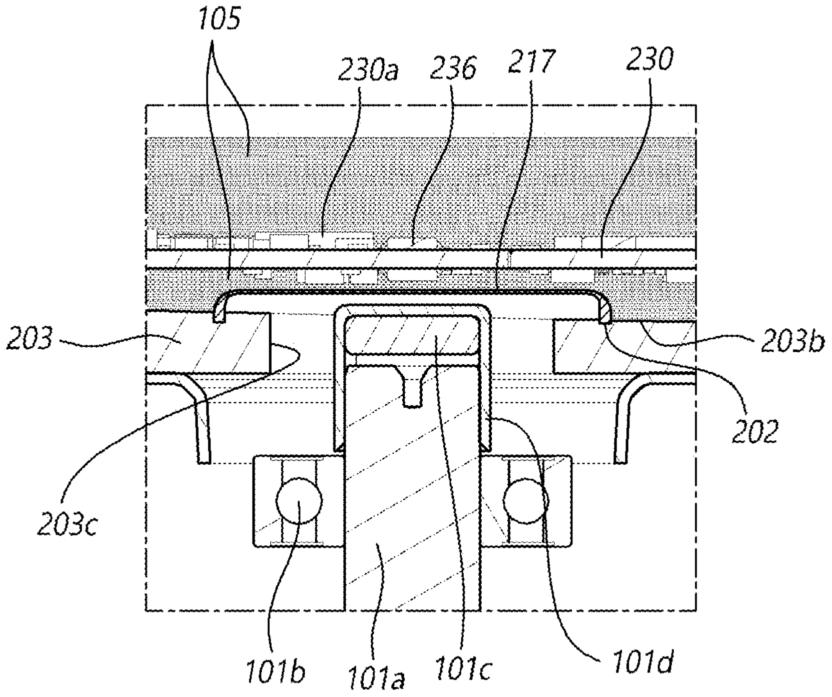

FIGS. 1 to 5 are perspective views illustrating a portion of a vehicle steering device according to an embodiment of the present disclosure. FIGS. 6 and 7 are cross-sectional views illustrating a portion of a vehicle steering device according to an embodiment of the present disclosure. FIG. 8 is an exploded perspective view illustrating a portion of a vehicle steering device according to an embodiment of the present disclosure. FIG. 9 is a perspective view illustrating a portion of a vehicle steering device according to an embodiment of the present disclosure. FIG. 10 is a plan view illustrating a portion of a vehicle steering device according to an embodiment of the present disclosure. FIG. 11 is a cross-sectional view taken along a line A-A' of FIG. 10. FIGS. 12 and 13 are cross-sectional views illustrating a portion of FIG. 11.

Referring to FIGS. 1 to 7, a vehicle steering device according to an embodiment of the present disclosure includes a power pack housing 110, a housing cover 120, and a sealing member or sealer 105. The power pack housing 110 may have a motor housing 101 in which a motor is embedded and a substrate housing 103 in which a printed circuit board 130 is embedded. The housing cover 120 may have an empty space 120S therein above the printed circuit board 130, be coupled to an upper end of the substrate housing 103, and have a communication hole 123 for communicating with the empty space 120S. The sealing member or sealer 105 may be injected through the communication hole 123 to fill the empty space 120S of the housing cover 120 and solidified in the empty space 120S of the housing cover 120.

A power pack including a motor and an electronic control unit may be configured to rotate vehicle wheels by sliding a rack bar via multiple components such as one or more gears and/or one or more belts (e.g., a worm wheel reducer or a belt reducer), leading to vehicle steering. This is a common feature in the technical art to which the present embodiments pertain, and no detailed description thereof is given herein.

In the power pack housing 110 including such a power pack, the motor housing 101 and the substrate housing 103 are integrally formed, and the housing cover 120 is coupled to an open portion (e.g. the upper end) of the substrate housing 103.

The substrate housing 103 which is substantially shaped as a box is formed above the motor housing 101, and the printed circuit board 130 of the electronic control unit is embedded in the substrate housing 103. However, the substrate housing 103 can have any shape which can accommodate the printed circuit board 130.

The housing cover 120 having a side end (or a side portion) **121*a* and an upper end (or an upper portion) 121*b* forms an empty space 120S above the printed circuit board 130. The housing cover 120 may be coupled to the upper end (or an open end) of the substrate housing 103. The housing cover 120 may have a communication hole 123 communicating with the inner empty space 120S from the outside of the housing cover 120 in the upper end (or the upper portion) 121*b* of the housing cover 120**.

The sealing member 105 may be injected into the empty space 120S between the housing cover 120 from the outside of the housing cover 120 through the communication hole 123 of the housing cover 120 to fill the empty space 120S between the housing cover 120 and the printed circuit board 130.

The sealing member 105 may be, for example, but not limited to, a liquid or gel-like fluid resin. The sealing member 105 is injected into the empty space 120S between the housing cover 120 and the printed circuit board 130 from the outside of the housing cover 120 through the communication hole 123 by an injection tube 102 and is then cooled and solidified, thereby filling the empty space 120S between the housing cover 120 and the printed circuit board 130 and hence blocking the space where moisture can enter into the inside of the power pack housing 110 from the outside of the power pack housing 110.

This sealing member 105 may be formed of a potting resin, such as silicone, urethane, epoxy, or polyacrylate, although not limited thereto. Any resin material which can be cooled and solidified after being injected into the empty space 120S between the housing cover 120 and the printed circuit board 130 may be used as the sealing member 105.

A mounting groove **103*a* which is opened toward the housing cover 120 is provided in the upper edge of the substrate housing 103, and an elastic supporting member (or an elastic support) 150 which supports the lower surface of the printed circuit board 130 while being capable of being elastically deformed is mounted or inserted in the mounting groove 103*a* of the substrate housing 103**.

Accordingly, the upper portion of the printed circuit board 130 is watertight by the sealing member 105, and the lower portion of the printed circuit board 130 is watertight by the elastic supporting member 150, thereby preventing an error or damage to components **130*a* of the printed circuit board 130** due to moisture.

The elastic supporting member 150 may include a mounting portion 151 that supports two opposite sides, in the width direction, of the mounting groove 103*a* while being capable of being elastically deformed and a substrate supporting portion 153 that extends from the upper end of the mounting portion 151 toward the printed circuit board 130 to support the lower surface of the printed circuit board 130 while being capable of being elastically deformed.

The mounting portion 151 can be elastically compressed and deformed while supporting the two opposite sides, in the width direction, of the mounting groove 103*a* and is coupled in the mounting groove 103*a* to maintain the correct position of the elastic supporting member 150.

The substrate supporting portion 153 protrudes and extends from the upper end of the mounting portion 151 toward a location where the printed circuit board 130 is to be mounted and, when the printed circuit board 130 is mounted on the substrate supporting portion 153, is elastically compressed and deformed to maintain the printed circuit board 130 horizontal, thereby preventing the printed circuit board 130 from bending while maintaining the lower portion of the printed circuit board 130 watertight.

Further, the elastic supporting member 150 may further include a groove supporting portion 155 that extends from the lower end of the mounting portion 151 to support the lower surface of the mounting groove 103*a* while being capable of being elastically deformed. For example, the elastic supporting member 150 may protrude in a direction opposite to a direction in which the substrate supporting portion 153 protrudes from the upper end of the mounting portion 151.

The groove supporting portion 155 protrudes and extends from the lower end of the mounting portion 151 and, when the elastic supporting member 150 is coupled or inserted to the mounting groove 103*a*, is elastically compressed and deformed to seal the inside of the mounting groove 103*a*, thereby preventing moisture which may be introduced into the mounting groove 103*a* from flowing to the printed circuit board 130 or the motor.

In an embodiment of the present disclosure, a filling housing 140 configured to communicate with the communication hole 123 may be further included in the power pack housing 110. The filling housing 140 may be disposed between the housing cover 120 and the printed circuit board 130, and be filled with the sealing member 105.

The filling housing 140 may have a plurality of partition walls 141 vertically formed upward of the printed circuit board 130 and connected to each other to form an area, above the printed circuit board 130, surrounded by the partition walls 141.

Accordingly, the sealing member 105 may be injected into only a partial or specific area, rather than the entire area, of the printed circuit board 130, by the plurality of partition walls. For example, the sealing member 105 may cover only an area where the components 130*a* mounted on the printed circuit board 130.

After the sealing member 105 injected into only the partial area of the filling housing 140 is solidified, the partition walls 141 may be removed.

Further, the filling housing 140 may have an upper plate 143 that covers the upper ends of the partition walls 141 connected to each other.

The upper plate 143 of the filling housing 140 may have a tube-shaped coupling portion 145 with an injection hole 145*a* and inserted or coupled into the communication hole 123 of the housing cover 120.

Therefore, assembly of the filling housing 140 and injection of the sealing member 105 may be performed easily by inserting or coupling the coupling portion 145 of the filling housing 140 into the communication hole 123 of the housing cover 120. Further, since the coupling portion 145 of the filling housing 140 may be removed from the communication hole 123 after the sealing member 105 is solidified, it may be easy to remove the filling housing 140.

Referring to FIGS. 8 to 13, a vehicle steering device according to an embodiment of the present disclosure includes a power pack housing 210. The power pack housing 210 may include a motor housing 201 in which a motor is embedded and a substrate housing 203 in which a printed circuit board 230. The substrate housing 203 may include a bottom portion 203*b* where the printed circuit board 230 is mounted and a plurality of sidewall portions 203 vertically connecting edges of the bottom portion 203*b* and a sealing member or sealer 105 injected into the substrate housing 203 to fill an upper space and a lower space of the printed circuit board 230 and solidified.

The vehicle steering device according to an embodiment of the present disclosure may further include a housing cover 220 coupled to an open portion (e.g. the upper end) of the substrate housing 203.

An inner surface of any one sidewall portion 203 among the plurality of sidewall portions 203 of the substrate housing 203 formed in substantially a box shape has a protruding surface 211 which is inclined with a degree of inward protrusion that increases from the upper end portion to the bottom portion 203*b*. However, the substrate housing 203 can have any shape which can accommodate the printed circuit board 230.

Accordingly, when the sealing member or sealer 105 is injected, the sealing member 105 is first injected to the protruding surface 211 so that the sealing member 105 flows along the inclined protruding surface 211 via the bottom portion 203*b* and gradually fills toward the opposite sidewall portion 203 by gravity.

If the sealing member 105 is injected from the sidewall portion 203 having the protruding surface 211 and fills in the opposite direction, the generation of air bubbles in the sealing member 105 may be minimized, and air bubbles left inside after the sealing member 105 is solidified may also be minimized, thereby leaving no space for moisture to stay.

A horizontal supporting portion 215 which protrudes upward from the bottom portion 203*b* to horizontally support the printed circuit board 230 is provided at or in a corner of the bottom portion 203*b* of the substrate housing 203.

Accordingly, a space or gap may be formed between the lower surface of the printed circuit board 230 and the bottom portion 203*b* of the substrate housing 203, so that the sealing member 105 can fill the lower portion of the printed circuit board 230.

Further, the bottom portion 203*b* is formed as an inclined surface of which vertical spacing from the printed circuit board 230 increases in the direction opposite to the sidewall portion 203 having the protruding surface 211.

Therefore, when the sealing member 105 injected to the protruding surface 211 fills the space between the printed circuit board 230 and the bottom portion 203*b*, the filling of the sealing member 105 in one direction may be accelerated to the opposite partition wall through the inclined bottom surface 203*b* by gravity, thereby allowing the sealing member 105 to be uniformly cooled and solidified with an even temperature distribution in the entire area of the sealing member 105, without leaving air bubbles inside the sealing member 105.

A magnet 101*c* is provided at an end portion of the shaft 101*a* of the motor, and a motor position sensor 236 is provided on the printed circuit board 230 at a position facing the shaft 101*a* of the motor to detect a change in the magnetic field of or from the magnet 101*c* when the motor shaft 101*a* rotates.

Further, the bottom portion 203*b* has a shaft hole 203*c* through which the motor shaft 101*a* passes and a hole cover 217 covering the shaft hole 203*c* to prevent the sealing member 105 from entering the motor through the shaft hole 203*c* while preventing the influx of moisture from the outside of the substrate housing 203.

The hole cover 217 may be coupled to the bottom portion 203*b* of the substrate housing 203 by an adhesive or may be coupled and fixed to a coupling recess 202 formed in the bottom portion 203*b* of the substrate housing 203.

After the hole cover 217 is assembled or provided, the sealing member 105 fills the entire space between the lower portion of the printed circuit board 230, the upper portion of the hole cover 217, and the bottom portion 203*b*.

The bottom portion 203*b* of the substrate housing 203 has a terminal hole 213 through which a motor terminal 201*b* passes, and the elastic member 201*c* is disposed or coupled between the terminal 201*b* and the terminal hole 213 while being elastically deformed.

The printed circuit board 230 has a terminal connection hole 233. The motor terminal 201*b* is coupled or soldered to the terminal connection hole 233 to electrically connect to the components 230*a* of the printed circuit board 230 and the motor.

Accordingly, the airtightness caused by the elastic member 201*c* may prevent the influx of moisture from the outside of the substrate housing 203 through the terminal hole 213 of the bottom portion 203*b* of the substrate housing 203.

By coupling the elastic member 201*c* to the terminal hole 213 as described above, the sealing member 105 may fill the entire space between the lower portion of the printed circuit board 230, the terminal 201*b*, and the upper portion of the elastic member 201*c*.

The printed circuit board 230 has one or more substrate holes 231 passing through the upper surface and lower surface of the printed circuit board 230.

Accordingly, the sealing member 105 may flow through the substrate holes 231 when filling the upper portion and lower portion of the printed circuit board 230 and may thus be uniformly cooled and solidified with an even temperature distribution in the entire area without leaving air bubbles inside the sealing member 105.

Among the substrate holes 231, a substrate hole 231 in the center of the printed circuit board 230 may have the largest diameter, and the diameters of the substrate holes may decrease in the radial direction from the center of the printed circuit board 230, thereby allowing the sealing member 105 to have an even temperature distribution in the entire area without leaving air bubbles inside the sealing member 105.

In other words, as the motor housing 201 and substrate housing 203 formed of a metal have higher thermal conductivity than the printed circuit board 230, the sealing member 105 can be cooled first at the bottom portion 203*b* and sidewall portion 203 of the substrate housing 203 and is cooled last in the central area of the printed circuit board 230.

Accordingly, air bubbles that may be formed while the sealing member 105 is cooled and solidified may move to the center of the printed circuit board 230 while flowing to the upper and lower portions of the printed circuit board 230 through the substrate holes 231 to exchange heat. Thus, the sealing member 105 may have an even temperature distribution in the entire area, and the air bubbles remaining in the sealing member 105 may be minimized.

As described above, according to some embodiments of the present disclosure, it is possible to prevent an error or failure in the electronic control unit due to the influx of moisture into the electronic control unit in a vehicle steering device.

It is also possible to prevent a malfunction or failure in the electronic control unit during autonomous driving, and a failure in two electronic control units provided for securing reliability due to the influx of moisture, thereby securing the driver's safety.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed:

1. A vehicle steering device, comprising:

a power pack housing having a motor housing accommodating a motor and a substrate housing accommodating a printed circuit board;

a housing cover coupled to an open end portion of the substrate housing to form an inner space above the printed circuit board, and having a communication hole for connecting between the inner space of the housing cover and an outside of the housing cover; and a sealer disposed in the inner space between the housing cover and the printed circuit board, wherein:

a mounting groove is provided at an upper edge of the substrate housing, the mounting groove opened toward the housing cover, and an elastic support is mounted in the mounting groove of the substrate housing to elastically support a lower surface of the printed circuit board.

2. The vehicle steering device of claim 1, wherein the elastic support includes:

a mounting portion elastically supporting two opposite sides of the mounting groove of the substrate housing; and a substrate supporting portion extending from an upper end of the mounting portion toward the printed circuit board to elastically support the lower surface of the printed circuit board.

3. The vehicle steering device of claim 2, wherein the elastic support has a portion extending from a lower end of the mounting portion to elastically support a lower surface of the mounting groove of the substrate housing.

4. A vehicle steering device, comprising:

a power pack housing having a motor housing accommodating a motor and a substrate housing accommodating a printed circuit board;

a housing cover coupled to an open end portion of the substrate housing to form an inner space above the printed circuit board, and having a communication hole for connecting between the inner space of the housing cover and an outside of the housing cover;

a sealer disposed in the inner space between the housing cover and the printed circuit board; and a filling housing connected to the communication hole of the housing cover, disposed between the housing cover and the printed circuit board, and filled with the sealer.

5. The vehicle steering device of claim 4, wherein the filling housing has a plurality of partition walls formed vertically with respect to the printed circuit board and connected to each other to form a space above the printed circuit board.

6. The vehicle steering device of claim 5, wherein the filling housing has an upper plate covering upper ends of the partition walls connected to each other.

7. The vehicle steering device of claim 6, wherein the upper plate of the filling housing has an injection hole to be coupled to the communication hole of the housing cover.

8. A vehicle steering device, comprising:

a power pack housing including a motor housing accommodating a motor and a substrate housing accommodating a printed circuit board, wherein the substrate housing includes a bottom portion above which the printed circuit board is mounted and a plurality of sidewall portions vertically extended from edges of the bottom portion of the substrate housing; and a sealer disposed in the substrate housing to fill an upper space and a lower space of the printed circuit board, wherein:

the bottom portion of the substrate housing has a terminal hole through which a terminal of the motor passes, and an elastic material is disposed between the terminal of the motor and the terminal hole of the bottom portion of the substrate housing.

9. The vehicle steering device of claim 8, wherein one of the plurality of sidewall portions of the substrate housing has an inner surface angled to protrude inwardly such that a degree of inward protrusion of the inner surface increases toward the bottom portion of the substrate housing.

10. The vehicle steering device of claim 9, wherein a horizontal support protruding upwardly from the bottom portion of the substrate housing to support the printed circuit board is provided at a corner of the bottom portion of the substrate housing.

11. The vehicle steering device of claim 10, wherein the bottom portion of the substrate housing has an inclined surface in which a vertical distance between the bottom portion of the substrate housing and the printed circuit board increases in a direction away from the angled inner surface of the one of the plurality of sidewall portions of the substrate housing.

12. The vehicle steering device of claim 8, wherein the bottom portion of the substrate housing has a shaft hole through which a shaft of the motor passes and a hole cover covering the shaft hole.

13. The vehicle steering device of claim 12, wherein the hole cover is coupled to the bottom portion of the substrate housing by an adhesive or is coupled to a coupling recess formed on the bottom portion of the substrate housing.

14. The vehicle steering device of claim 12, wherein the sealer fills a space between the printed circuit board and the hole cover and between the printed circuit board and the bottom portion of the substrate housing.

15. The vehicle steering device of claim 8, wherein the sealer fills a space between the printed circuit board and the elastic material disposed between the terminal of the motor and the terminal hole.

16. The vehicle steering device of claim 8, wherein the printed circuit board has a plurality of substrate holes passing through an upper surface and a lower surface of the printed circuit board.

17. The vehicle steering device of claim 16, wherein a substrate hole in a center of the printed circuit board has a largest diameter among the plurality of substrate holes of the printed circuit board.

* * * * *